(12) United States Patent
Lehmann

(10) Patent No.: US 6,745,982 B2
(45) Date of Patent: Jun. 8, 2004

(54) PRESSURE RATE OF CHANGE SENSITIVE LATCHING METHOD AND APPARATUS

(75) Inventor: Michael G. Lehmann, Mount Vernon, WA (US)

(73) Assignee: Northwest Aerospace Technologies, Inc., Everett, WA (US)

( * ) Notice: Subject to any disclaimer, the term of this patent is extended or adjusted under 35 U.S.C. 154(b) by 0 days.

(21) Appl. No.: 10/300,681

(22) Filed: Nov. 19, 2002

(65) Prior Publication Data

US 2003/0132345 A1 Jul. 17, 2003

Related U.S. Application Data

(60) Provisional application No. 60/415,441, filed on Oct. 1, 2002, and provisional application No. 60/349,774, filed on Jan. 16, 2002.

(51) Int. Cl.⁷ ................................................ B64C 1/14
(52) U.S. Cl. ................................ 244/118.5; 244/129.5
(58) Field of Search .......................... 244/129.4–129.5, 244/118.5, 129.1; 454/70–74; 49/31, 21, 506; 137/81.1; 292/DIG. 65, 32, 33, 92, 137, 138, 144

(56) References Cited

U.S. PATENT DOCUMENTS

| | | | |
|---|---|---|---|
| 3,559,559 A | * 2/1971 | Furlong et al. ............ 137/81.1 |
| 3,658,277 A | 4/1972 | Anderson .................... 244/1 R |
| 3,680,499 A | 8/1972 | Boudreau ..................... 109/32 |
| 3,704,845 A | 12/1972 | Ord ............................. 244/121 |
| 3,811,643 A | 5/1974 | Pizzo ..................... 244/137 P |
| 3,829,138 A | 8/1974 | Morita ........................ 292/254 |
| 3,841,328 A | 10/1974 | Jensen .................... 128/218 F |
| 4,042,193 A | 8/1977 | Cerne ...................... 244/129.1 |
| 4,164,899 A | * 8/1979 | Burgess ....................... 454/71 |
| 4,522,359 A | 6/1985 | Church et al. ........... 244/129.5 |
| 4,681,286 A | 7/1987 | Church et al. ........... 244/129.5 |
| 4,915,326 A | 4/1990 | Plude ...................... 244/129.5 |
| 5,273,486 A | * 12/1993 | Emmons et al. .............. 454/74 |
| 5,590,852 A | * 1/1997 | Olson ...................... 244/118.5 |
| 6,158,692 A | 12/2000 | Abild et al. ............. 244/129.5 |
| 6,484,449 B1 | * 11/2002 | Artsiely .................... 244/129.5 |
| 2002/0014557 A1 | 2/2002 | Erben et al. ............. 244/129.5 |

FOREIGN PATENT DOCUMENTS

JP      2001-10591      1/2001

OTHER PUBLICATIONS

"Aircraft Security Enhancement," *Airbus Technical Digest*, pp. 1–11, Dec. 2002.

* cited by examiner

*Primary Examiner*—Galen L. Barefoot
(74) *Attorney, Agent, or Firm*—Seed IP Law Group PLLC

(57) ABSTRACT

A rate of change in pressure identifies a rapid decompression event in an aircraft, and automatically unlatches a door to allow rapid equalization of pressure throughout the aircraft, allowing for use of doors with greater structural integrity then in current use.

37 Claims, 9 Drawing Sheets

PRESSURE RATE OF CHANGE SENSITIVE LATCHING METHOD AND APPARATUS

BACKGROUND OF THE INVENTION

1. Field of the Invention

The present description generally relates to aircraft, and particularly to securing doors in aircraft.

2. Description of the Related Art

There is a compelling desire to improve security in aircraft. One area of particular concern is the door in the bulkhead that separates the flightdeck and the passenger cabin of the aircraft. The door must allow access between the flightdeck and the cabin under certain circumstances, for example, when authorized flight crew requires access. The door must prevent access under other circumstances, for example, when unauthorized persons attempt to access the flightdeck. Existing systems include a switch that is controlled from the flight deck and which provides two options (i.e., door locked or latched, door unlocked or unlatched).

Existing doors are designed to give way under sudden decompression of either the cabin or the flightdeck, allowing the rapid equalization of the pressure between the flightdeck and the cabin. This is a desirable effect, which may prevent more substantial damage from occurring to the aircraft, caused by the significant variation in pressure between the flightdeck and the cabin during a rapid decompression event. One proposal for improving security includes equipping aircraft with stronger doors and latches in the bulkhead separating the flightdeck and the passenger cabin. However, the additional structural integrity will prevent the doors from giving way during sudden decompression event, preventing the desired rapid equalization of pressure throughout the aircraft.

Thus, there is a need for an improved approach in aircraft design that allows for structurally secure doors, while also permitting fast pressure equalization during rapid decompression events. Further, there is a need for an improved approach to controlling access through doors in the bulkheads in aircraft.

BRIEF SUMMARY OF THE INVENTION

In one aspect, a system for monitoring interior pressure change in an aircraft having a bulkhead separating a flight deck portion of the aircraft from a cabin portion of the aircraft, the bulkhead including a door and a latch, includes a first pressure sensor that provides flight deck pressure signals corresponding to a rate of change of an ambient pressure in the flight deck portion of the aircraft; and a first comparator responsive to the flight deck pressure signals to provide a first actuation signal in response to a comparison of the rate of change of the ambient pressure in the flight deck portion to at least a first minimum reference level. Determining the rate of pressure change may permit a quicker reaction to a rapid decompression event than would be possible based on a determination of the difference in pressures across a bulkhead.

In another aspect, a system for monitoring interior pressure change for an aircraft includes a first pressure sensor responsive to a rate of change of a first ambient pressure in a first portion of the aircraft to produce an output proportional to the rate of change of the first ambient pressure in the first portion of the aircraft; and a comparator responsive to the output of the first pressure sensor to control a door locking mechanism based on a comparison of the rate of change of the first ambient pressure to at least a first reference level.

In yet another aspect, a method of monitoring interior pressure change in an aircraft having a bulkhead separating a flight deck portion of the aircraft from a cabin portion of the aircraft, the bulkhead including a door and a latch includes determining a rate of change in an ambient pressure in the fight deck portion of the aircraft, and automatically unlatching the door if the rate of change in the ambient pressure in the flight deck portion of the aircraft exceeds a first minimum threshold.

In even a further aspect, a method of monitoring interior pressure change in an aircraft having a bulkhead separating a flight deck portion of the aircraft from a cabin portion of the aircraft, the bulkhead including a door and a latch includes repeatedly determining the ambient pressure in the flight deck portion of the aircraft; and differentiating the determined ambient pressure in the flight deck portion with respect to time.

In yet a further aspect, a method of monitoring interior pressure change in an aircraft having a bulkhead separating a flight deck portion of the aircraft from a cabin portion of the aircraft, the bulkhead including a door having a latch determining a rate of change in an ambient pressure in the fight deck portion of the aircraft; automatically unlatching the door if the determined rate of change in the ambient pressure in the flight deck portion of the aircraft is between a first minimum threshold and a first maximum threshold, the first maximum threshold greater than the first minimum threshold.

In even another aspect, a method of operating a latch of a door in an aircraft includes determining whether the rate of change in the first interior pressure of the first portion of an aircraft satisfies a defined first set of criteria; and providing an unlatching signal to an actuator to unlatch the door if the rate of change in the first interior pressure in the first portion of the aircraft meets the defined first set of criteria.

In still a further aspect, pressure rate sensitive system for use in an aircraft having a flight deck and a cabin separated from the flight deck, includes first rate of change means for determining a rate of change in a pressure in the flight deck; first determination means for determining whether the rate of change in the pressure in the flight deck satisfies a defined first set of criteria; and access controlling means responsive to the first determination means for controlling access between the flight deck and the passenger cabin of the aircraft.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have solely been selected for ease of recognition in the drawings.

DETAILED DESCRIPTION OF THE INVENTION

In the following description, certain specific details are set forth in order to provide a thorough understanding of various embodiments of the invention. However, one skilled in the art will understand that the invention may be practiced without these details. In other instances, well-known structures associated with aircraft, power systems, doors, latch mechanisms, controllers, and microprocessors have not been shown or described in detail to avoid unnecessarily obscuring descriptions of the embodiments of the invention.

Unless the context requires otherwise, throughout the specification and claims which follow, the word "comprise" and variations thereof, such as, "comprises" and "comprising" are to be construed in an open, inclusive sense, that is as "including, but not limited to."

The headings provided herein are for convenience only and do not interpret the scope or meaning of the claimed invention.

Figure 1:
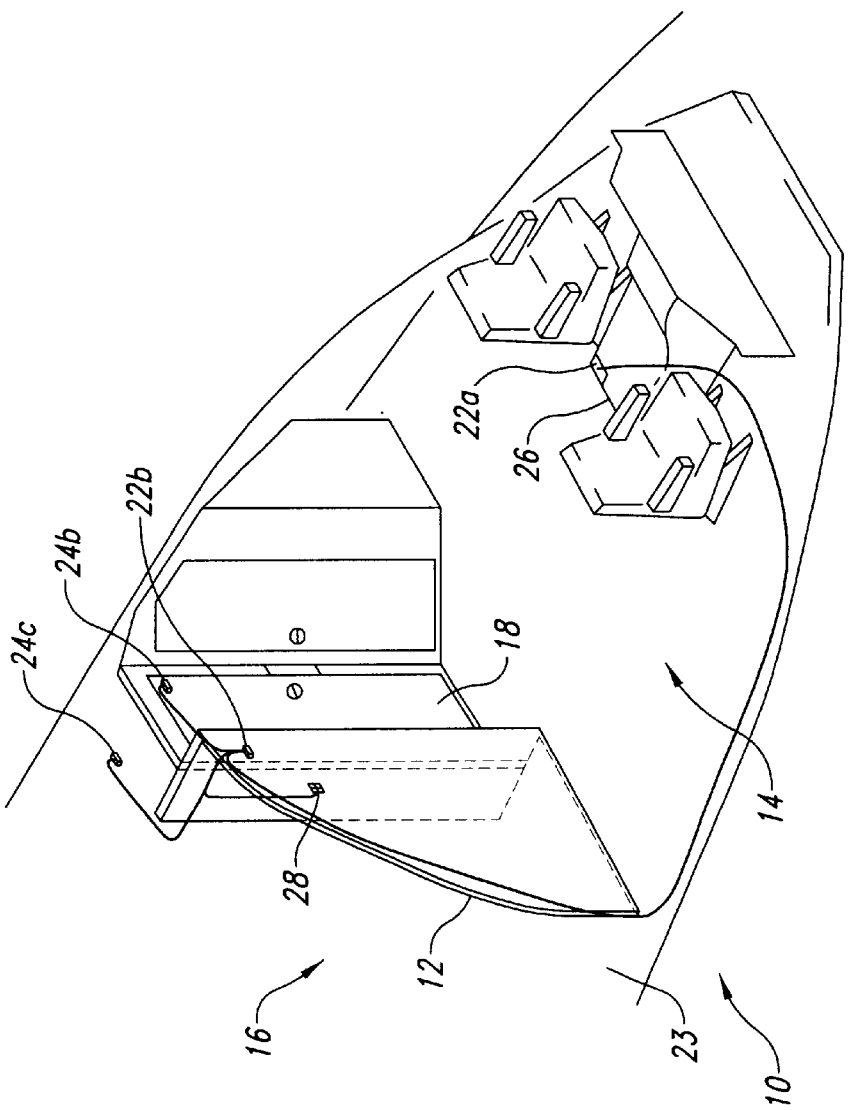
FIG. 1 is an isometric view of a portion of an aircraft showing a flight deck, a passenger cabin and various locations for the components of an access control system according to one illustrated embodiment of the invention.

FIG. 1 shows an aircraft 10 having a bulkhead 12 separating a flightdeck 14 from a passenger cabin 16. The flightdeck 14 is a limited access area, from which authorized personnel, such as pilots, control the aircraft 10. The passenger cabin 16 is a general access area in which the passengers are seated. A door 18 selectively provides access through an entry in the bulkhead 12 between the flightdeck 14 and passenger cabin 16.

An access control system 20 (FIG. 2) controls the operation of one or more latch mechanisms 21 to latch and unlatch the door 18 for selectively providing access between the flightdeck 14 and the passenger cabin 16. The terms locked and latched, as well as unlocked and unlatched, are used interchangeably throughout the specification and the claims to refer to a condition in which the door 18 cannot be open and a condition in which the door 18 can be opened, respectively.

The access control system 20 includes a controller, generally referenced as 22, for processing input signals and providing output signals. The controller 22 may be located anywhere in the aircraft 10, although the flightdeck 14 provides a particularly suitable, secure and conveniently accessible area for the controller 22. For example, the controller 22a may be located on a flight control panel such as a console 26, within easy reach of the pilots. Alternatively, the controller 22 may be located elsewhere on the flightdeck 14, for example, the controller 22b attached to the bulkhead 12.

The access control system 20 also includes a number of pressure sensors, referenced generally as 24, for determining ambient pressure levels. At least one of the pressure sensors 24 is located in the flightdeck 14. For example, one or more pressure sensors 24a may be integrated into the controller 22. Additionally, or alternatively, one or more pressure sensors 24b may be mounted separately on the flightdeck 14, for example, on the bulkhead 12.

Optionally, one or more pressure sensors 24c may be located in the passenger cabin 16 for determining the ambient pressure level in the passenger cabin 16.

The access control system 20 may further include an entry request module 28 located in the passenger cabin 16. For example, the entry request module 28 may be located on the bulkhead 12 next to the door 18 to permit requests for entry to the flightdeck 14 to be made from the passenger cabin 16.

Figure 2:
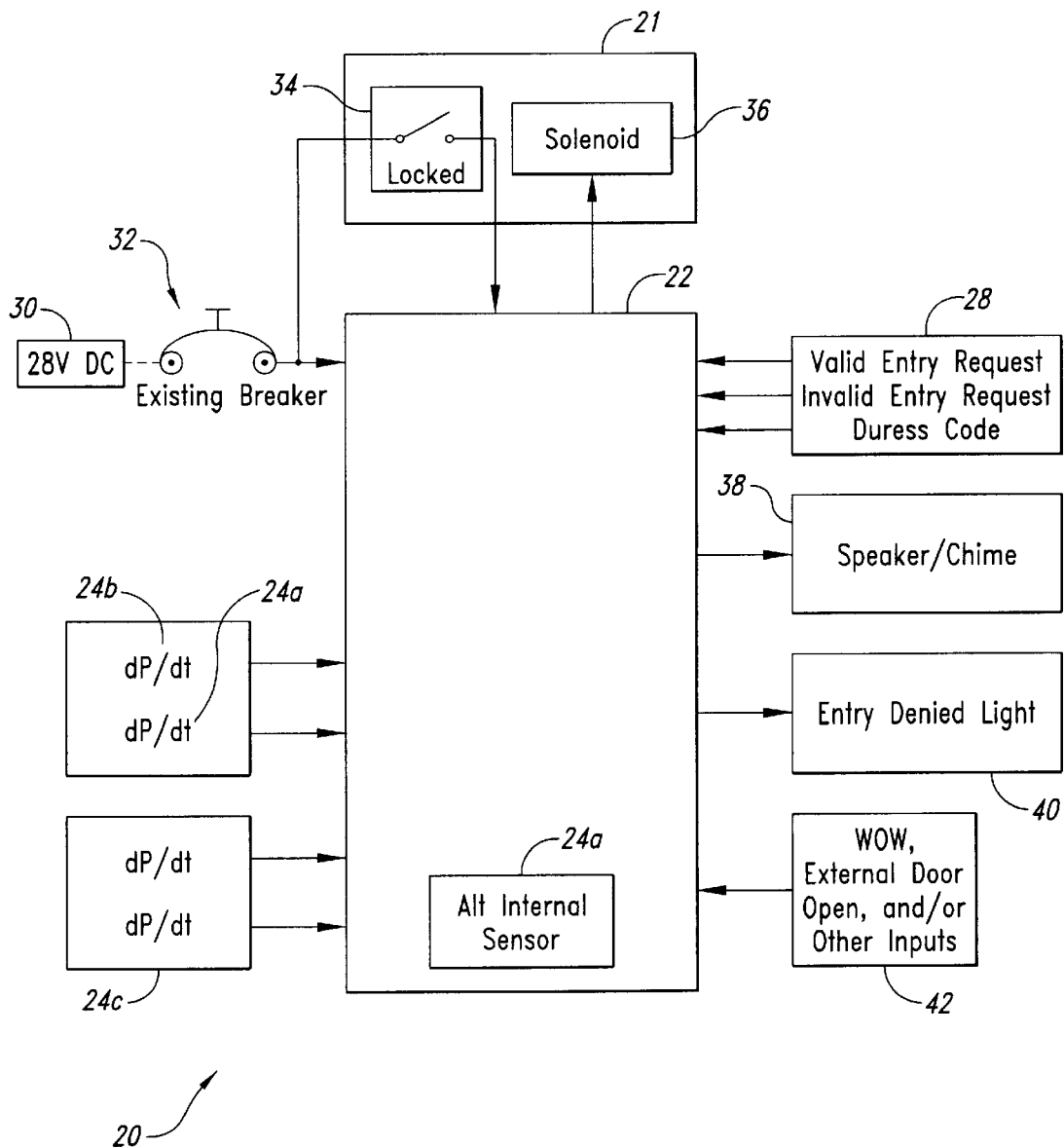
FIG. 2 is a block diagram showing an illustrated embodiment of a the access control system including a controller, a number of pressure sensors, a remote request module, and a latch mechanism including a switch and a solenoid.

FIG. 2 shows one illustrated embodiment of the access control system 20 including a routing of signals between various elements of the access control system 20. The controller 22 receives power from a 28V DC supply 30 associated with the aircraft's power bus, via a circuit breaker 32.

The controller 22 receives signals from the pressure sensors 24a, 24b on the flightdeck 14. These signals correspond to the ambient pressure in the flightdeck 14. The controller 22 may optionally receive signals from one or more pressure sensors 24c in the passenger cabin 16. These signals correspond to the ambient pressure in the passenger cabin 16. While in some embodiments the ambient pressure signals are proportional to the absolute pressure in the flight deck 14 or passenger cabin 16, in other embodiments the ambient pressure signals are proportional to the rate of change of pressure in the flight deck 14 or passenger cabin 16.

The controller 22 may receive signals from a switch 34 which is a portion of the latch mechanism 21. These signals identify the state (e.g., locked/latched or unlocked/unlatched) of latch mechanism 21. The controller 22 provides signals to a solenoid 36, also forming part of the latch mechanism 21, for selectively operating the lock or latch mechanism 21 between the locked/latched and unlocked/unlatched states.

The controller 22 may also receive signals from the access entry module 28, as will be described in further detail below.

The controller 22 may provide signals to activate an audio indicator such as a speaker or chime 38, and/or one or more visual indicators such as lights 40. The audio and visual indicators can provide a variety of indications regarding the access request system 20, for example, the status (e.g., operating mode, operating condition) of the access request system 20, requests for entry, and responses to requests for entry. Audio and/or visual indicators can be located in the flightdeck 14, as well as the passenger cabin 16.

In an optional embodiment, the controller 22 may further receive input from other aircraft system 42 indicating the status of those systems 42, where such status has a bearing on the operation of the access control system 20. For example, the controller 22 may receive input from a weight on wheels sensor that identifies whether there is weight on the wheels of the aircraft 10 indicating that the aircraft 10 is on the ground, or from an external door sensor indicating whether an external door in the aircraft is opened or closed, or from a variety of other aircraft systems 42. These inputs to the controller may allow the controller 22 to unlock or unlatch the door 18 in the event of a crash landing or in the case of an incapacitated flight crew.

Figure 3A:
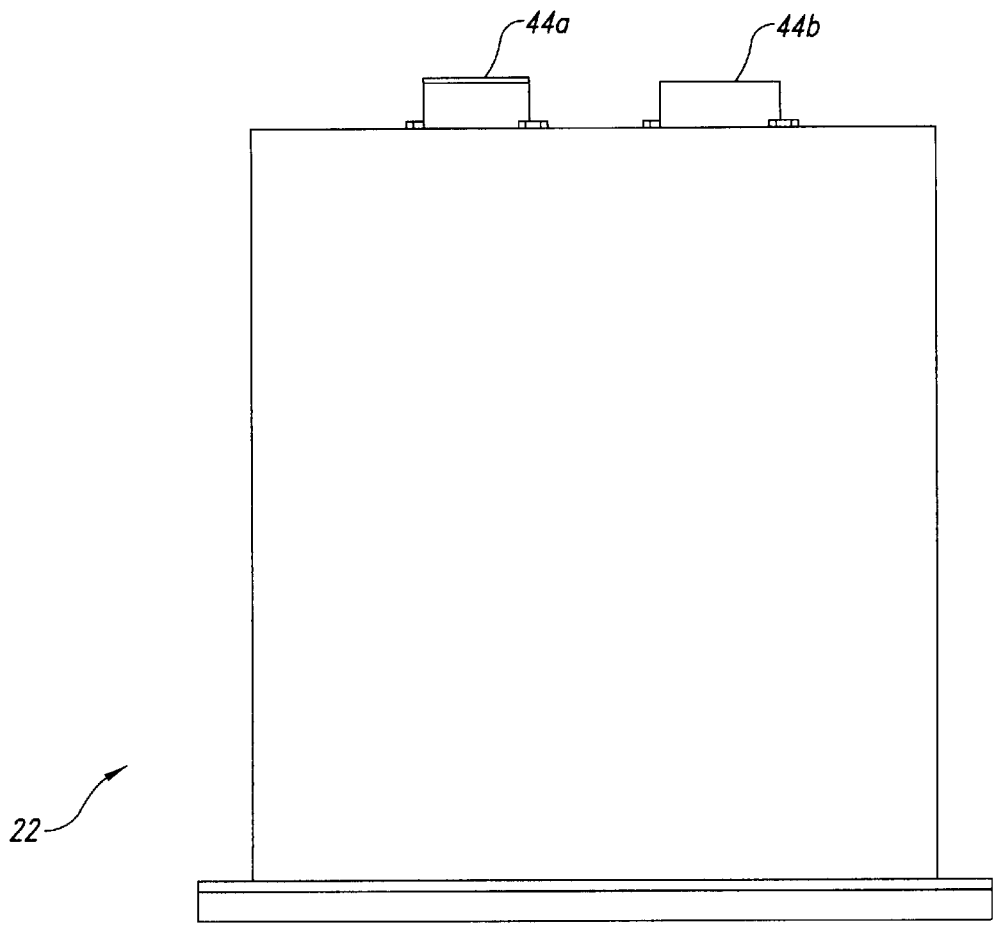
FIG. 3A is a top plan view of the controller.
Figure 3B:
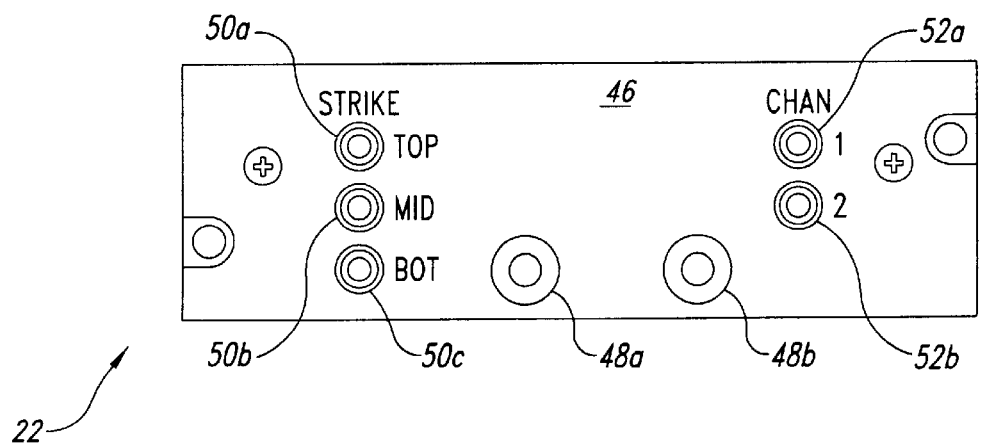
FIG. 3B is a front elevational view of the controller.
Figure 3C:
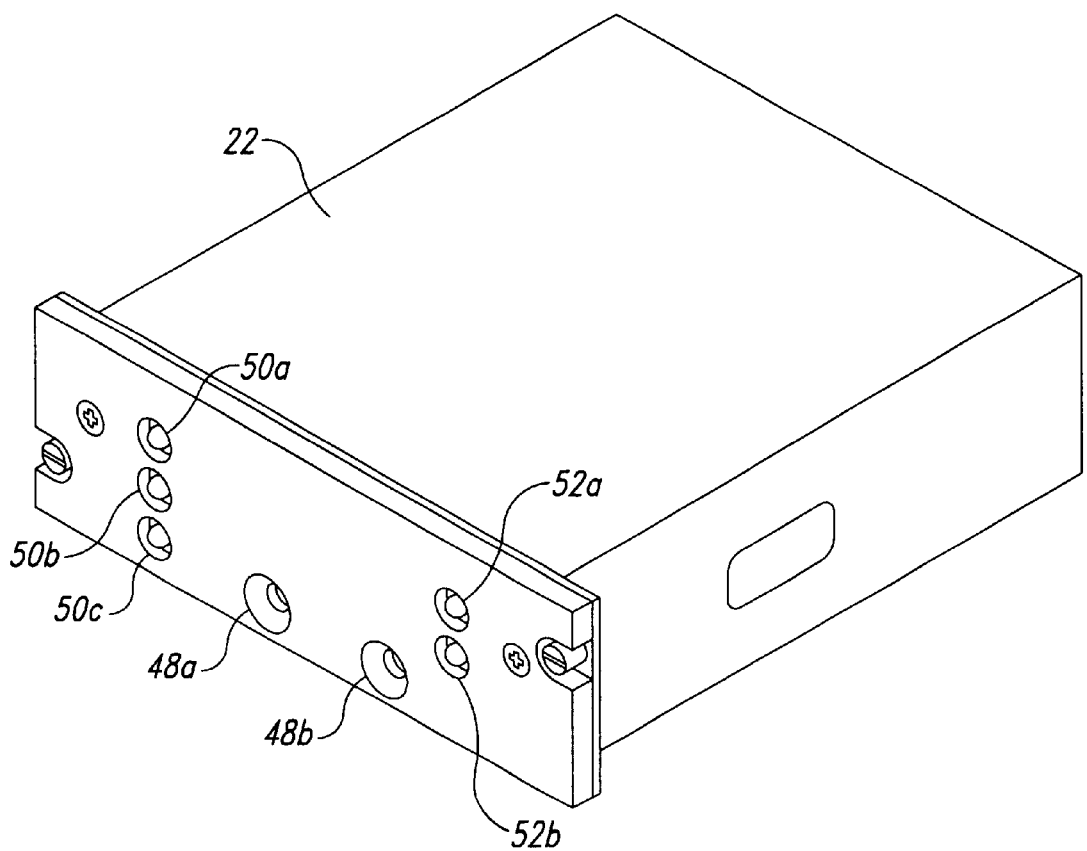
FIG. 3C is a top, front, right side isometric view of the controller.
Figure 4A:
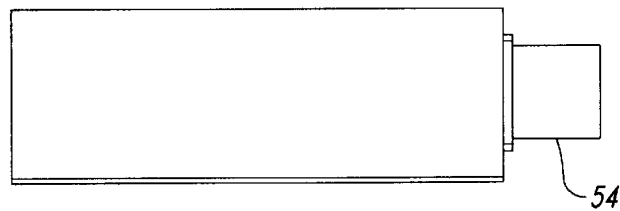
FIG. 4A is a top plan view of a latch mechanism including a strike for selectively securing a door.
Figures 4B, 4C:
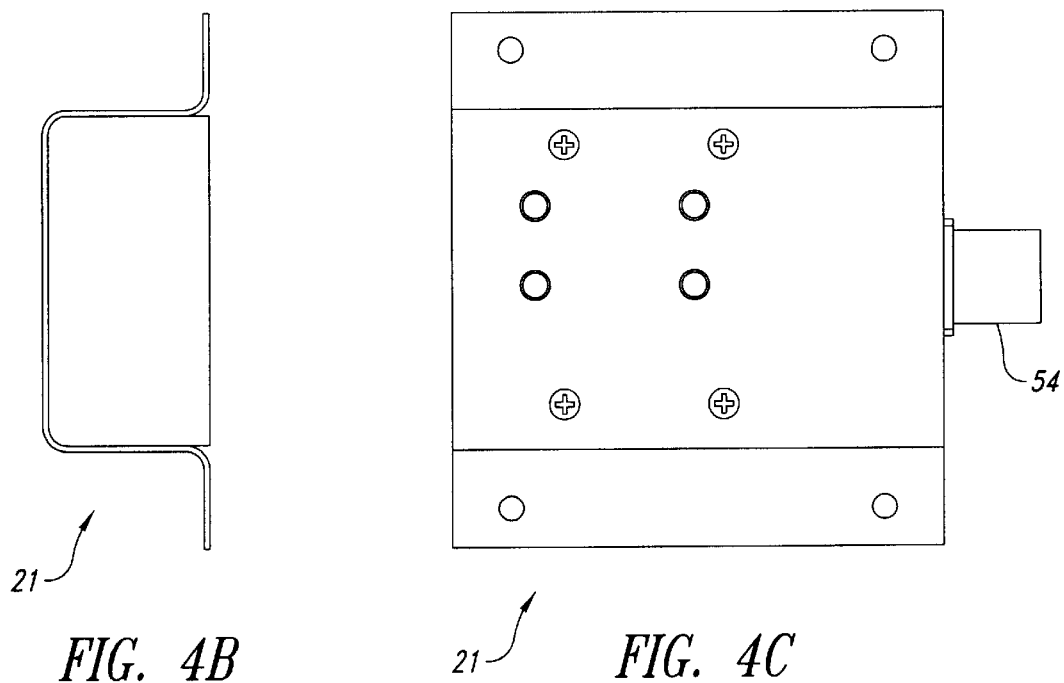
FIG. 4B is a left side elevational view of the latch mechanism of FIG. 4A.
FIG. 4C is a rear elevational view of the latch mechanism of FIG. 4A.
Figure 4D:
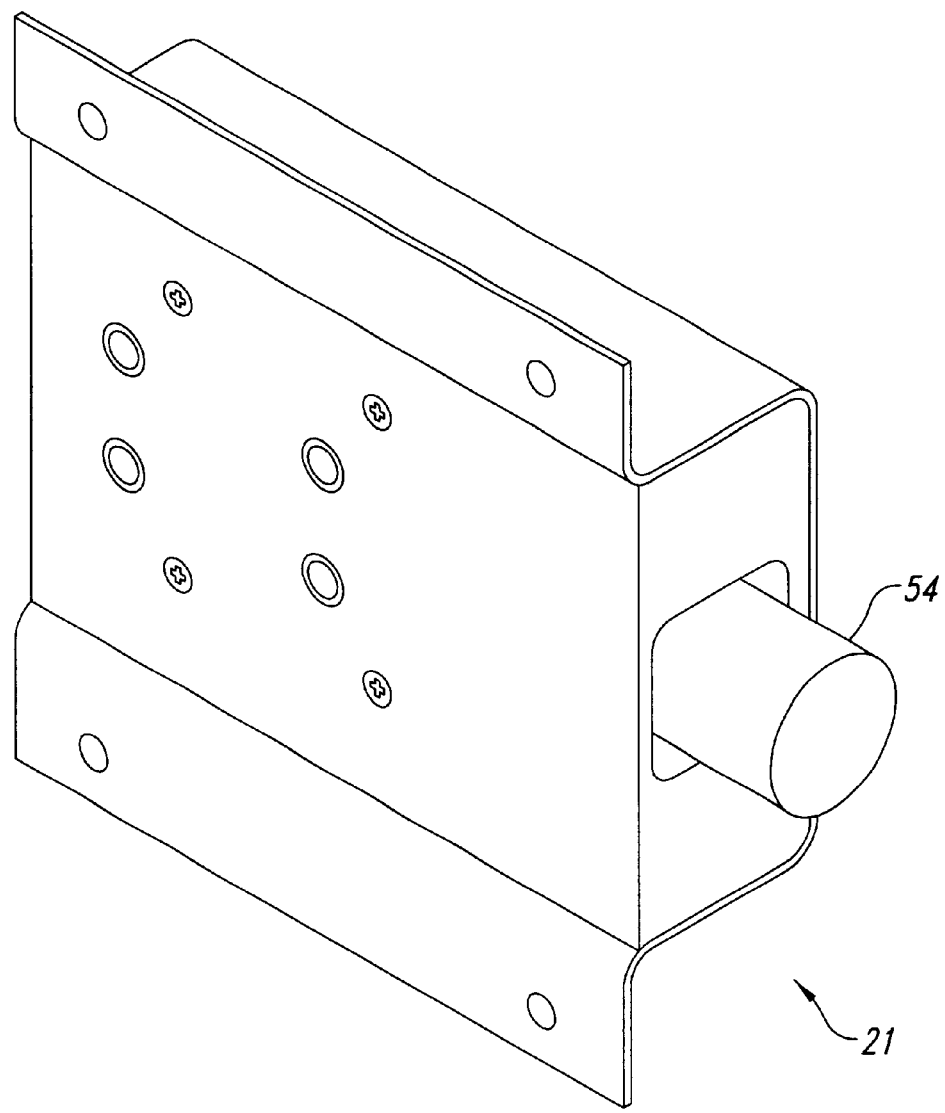
FIG. 4D is a rear, top, right side isometric view of the latch mechanism of FIG. 4A.

FIGS. 3A thru 3C show the controller 22. The controller 22 may include connectors 44a, 44b for making connections to the various components such as the pressure sensors 24, entry request module 28, switch 34, solenoid 36, speaker or chime 38, visual indicator 40, or other aircraft systems 42. Where the flightdeck pressure sensor 24a is mounted in the controller 22, a face 46 of the controller 22 may include one or more ports 48a, 48b for providing fluid communication between the pressure sensors 24a, 24b and the ambient atmosphere of a flightdeck 14. Multiple ports 48a, 48b, and their associated circuitry (i.e., channels) provide redundancy to the controller 22. The controller 22 may also include visual indicators such as light emitting diodes ("LEDs") 50a, 50b, 50c corresponding to respective ones of a top, middle and/or bottom latch mechanism 21 for securing the door 18. The controller 22 may further include visual indicators such as LEDs 52a, 52b identifying the status of each channel.

FIGS. 4A thru 4D show one illustrated embodiment of the latch mechanism 21 for securing the door 18 in the bulkhead 12. As discussed above, the control access system 20 may include one or more latch mechanisms 21, for example, a top, middle, and bottom latch mechanism 21 for securing the door 18.

The latch mechanism 21 is controlled via the controller 22. The latch mechanism 21 may include the switch 34 (FIG. 2), the solenoid 36 (FIG. 2) and a strike 54. The latch mechanism 21 may be mounted to the bulkhead 12, the strike 54 securely engaging and disengaging a portion of the door 18. Alternatively, the latch mechanism 21 may be mounted to the door 18, the strike 54 securely engaging and disengaging a portion of the bulkhead 12.

The solenoid 36 may be selectively energized to position the strike 54 for securing the door 18. In one embodiment, the solenoid 36 is configured such that the solenoid 36 must be energized to place the latch mechanism 21 in the locked state. Thus, the latch mechanism 21 will automatically enter the unlocked state on loss of power to the solenoid 36, for example in the event of a loss of power in the aircraft 10. One skilled in the art will recognize that the latch mechanism 21 may employ other equivalent electro-mechanical devices in addition to, or as a substitute for, the solenoid 36.

Figure 5A:
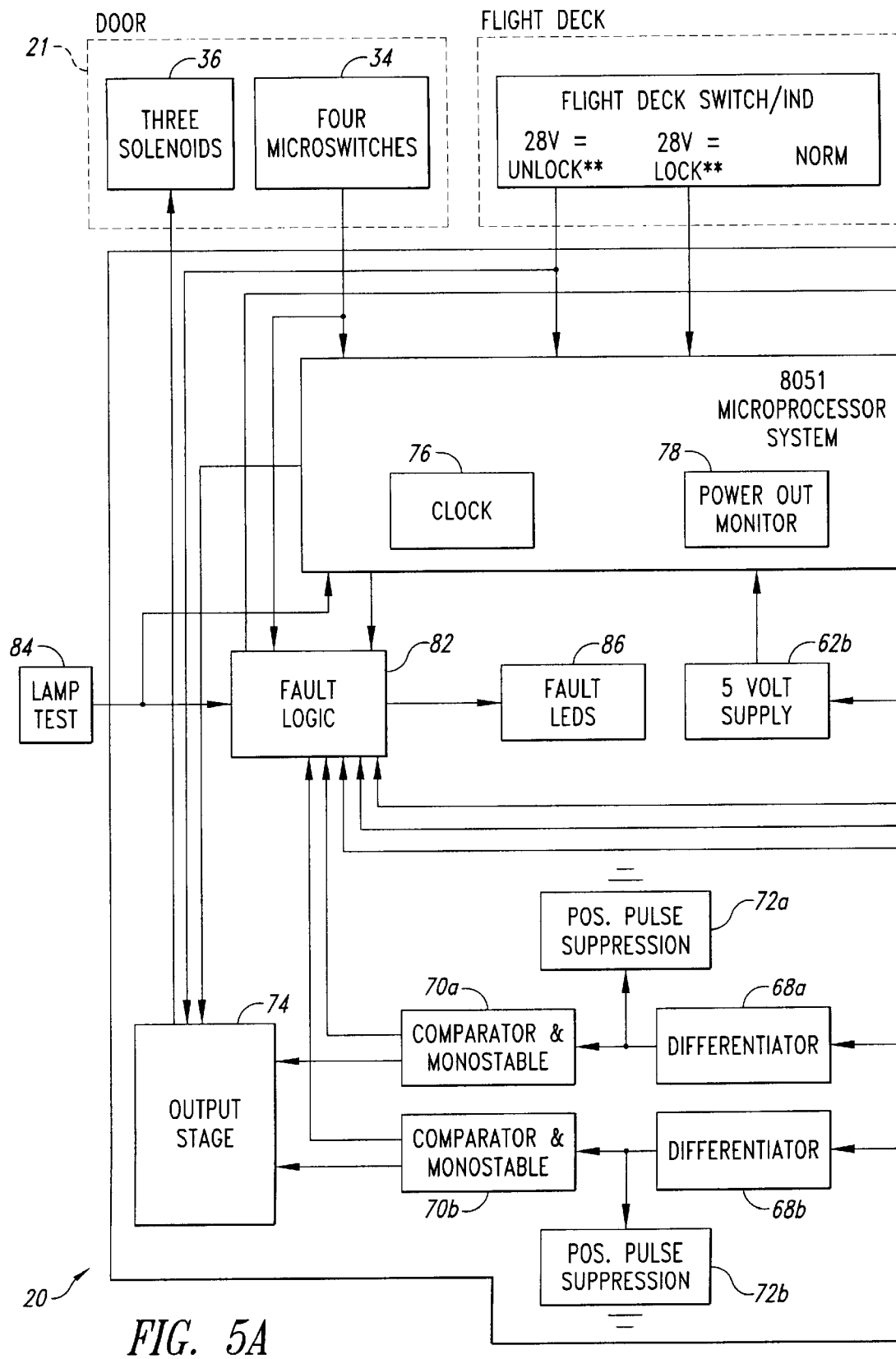
FIGS. 5A–5B are a functional block diagram showing an illustrated embodiment of the controller.
Figure 5B:
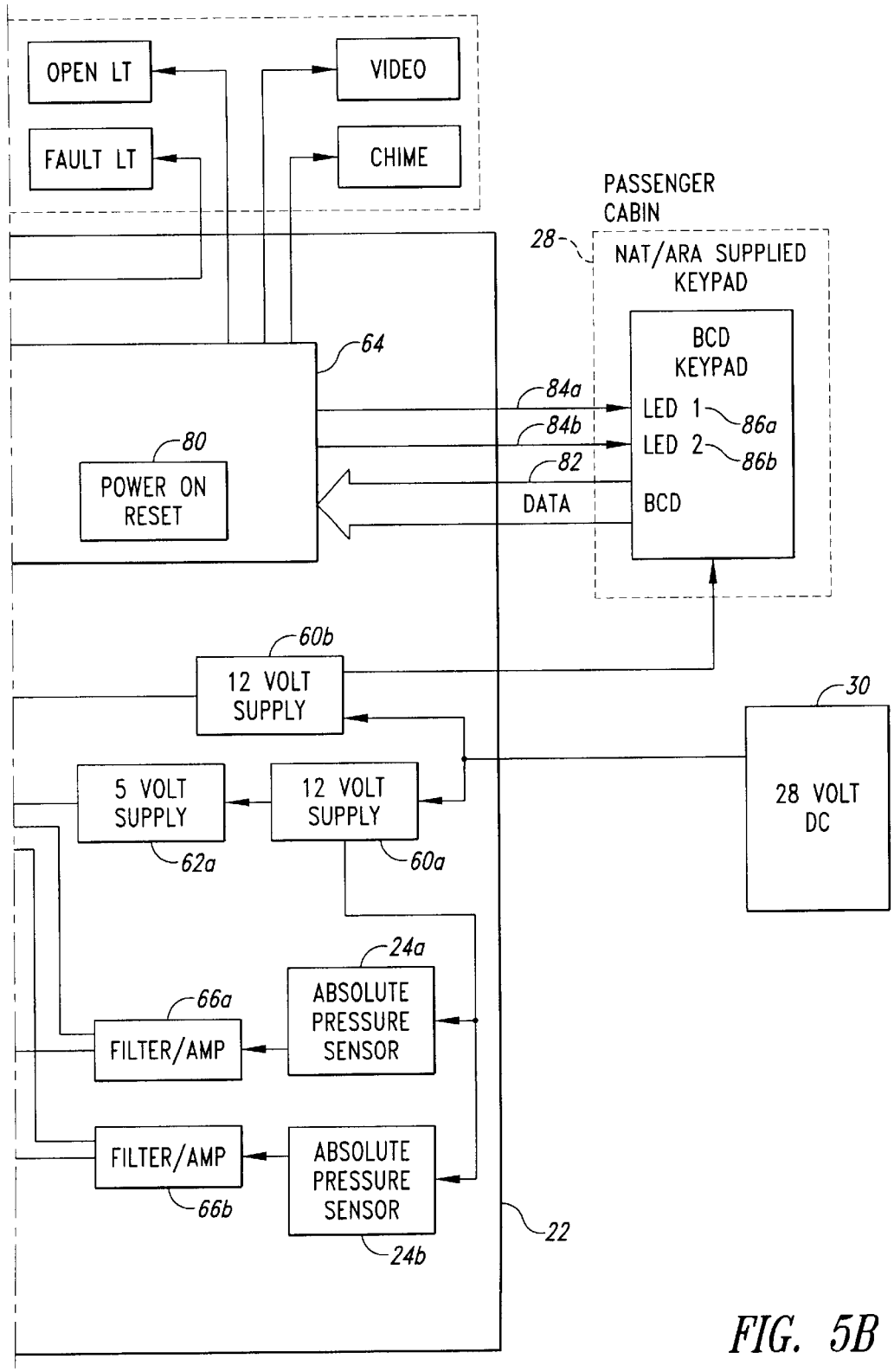

FIGS. 5A–5B show a particular embodiment of the access control system 20. The controller 22 receives power via the DC voltage bus 30 of the aircraft 10. A first 12V power supply 60a provides power to the pressure sensors 24a, 24b and to a first 5V power supply 62a. A second 12V power supply 60b supplies power to a microprocessor 64 via a second 5V power supply 62b.

As discussed above, the pressure sensors 24a, 24b are in fluid communication with the ambient environment of the flightdeck 14 for detecting the pressure of the ambient environment. The pressure sensors 24a, 24b provide a signal proportional to the absolute pressure of the ambient environment of the flightdeck 14. Optionally, pressure sensors 24c are in fluid communication with the ambient environment of the passenger cabin 16, and provide signals proportional the absolute pressure of the ambient environment of the passenger cabin 16. Some suitable pressure sensors 24 may include a strain gauge on silicon attached to a sealed vacuum reference. Some suitable pressure sensors 24 may have an operating range of 0 to 15 PSIA, with an overpressure rating of 40 PSIA. Some suitable pressure sensors 24 may have an output voltage in the range of 1.5V at 0 PSIA to 9V at 15 PSIA. The control access system 20 may accommodate other values or pressure sensors 24.

Filter and amplifier stages 66a, 66b filter noise and amplify the signals produced by the pressure sensors 24a, 24b. The filter and amplifier stages 66a, 66b may reduce environmental control systems transients, acoustical noise, and/or other fast changing signals that would otherwise inadvertently trigger the solenoid 36. Some suitable filter and amplifier stages 66a, 66b may, for example, contain a 2-pole unity gain VCVS filter. Some embodiments may omit either the filter, the amplifier, or both. The filtered and amplified signals are provided to differentiators 68a, 68b.

The differentiators 68a, 68b differentiate the filtered and amplified signals to produce signals proportional to a rate of change of pressure (i.e., dP/dt). One skilled in the art will recognize that the controller 22 may employ other suitable circuitry, or even software where processing is rapid enough, for rapidly determining the rate of change of pressure. The rate of change signals are provided to a comparator and monostable vibrator stage 70a, 70b.

The controller 22 may optionally include positive pulse suppression circuitry 72a, 72b. The positive pulse suppression circuitry 72a, 72b suppresses or attenuates signals from the differentiators 68a, 68b which exceed a defined maximum threshold and/or which are below a defined time duration. The positive pulse suppression prevents false triggering, for example, in response to a sudden change of pressure resulting from the discharge of a firearm or an explosion on board the aircraft 10. Some suitable positive pulse suppression circuitry 72a, 72b will attenuate the output from the differentiator 68a, 68b for approximately 1 ms.

The comparator monostable vibrator stages 70a, 70b determine whether the output from the differentiators 68a, 68b, with or without attenuation, exceeds a defined minimum threshold. The defined minimum threshold corresponds to the rate of change of pressure associated with a rapid decompression event, that requires the unlocking or unlatching of the door 18 to allow rapid equalization of pressure throughout the aircraft 10. The comparator monostable vibrator stage 70a, 70b provides signals to an output stage 74.

The output stage 74 is coupled to control the solenoid 36 of the latch mechanism 21. A suitable output stage 74 may take the form of a MOSFET transistor with a driver that can be driven from either one of two pressure sensing channels, or from an external input. In one embodiment, the external input signals place the solenoid 36 in an ON state when a ground (0V) is present at an appropriate input pin. In this embodiment, the solenoid 36 is in an OFF state when a high impedance is present. The output stage 74 may also include current limiting to protect the MOSFET from excessive currents.

The microprocessor 64 is optional in the controller 22 of the control access system 20. In the typical embodiment, the rate of change sensing circuitry 66, 68, 70, 74, as well as, the positive pulse suppression circuitry 72, will take the form of an analog circuit to realize the desired high speed operation of the rate of change sensing functionality. Given the nature of a rapid decompression event, high speed operation is highly desirable.

Where included in the control access system 20, the microprocessor 64 will typically handle user interface functions, such as receiving data 82 from the entry request module 28, and providing signals 84a, 84b to selectively actuate visual indicators 86a, 86b on the entry request module 28. The microprocessor 64 also provides signals to the visual and/or audio indicators on the controller 22 such as the chime 38 or LEDs 50a–50c. Some suitable microprocessors 64 may include a clock subsystem 76, power out monitor subsystem 78, and power on reset subsystem 80.

The controller 22 may also include fault detecting functionality, including fault logic for detecting a fault, a lamp test 84, and fault LEDs 86 for indicating the existence or absence of a fault.

Figure 6:
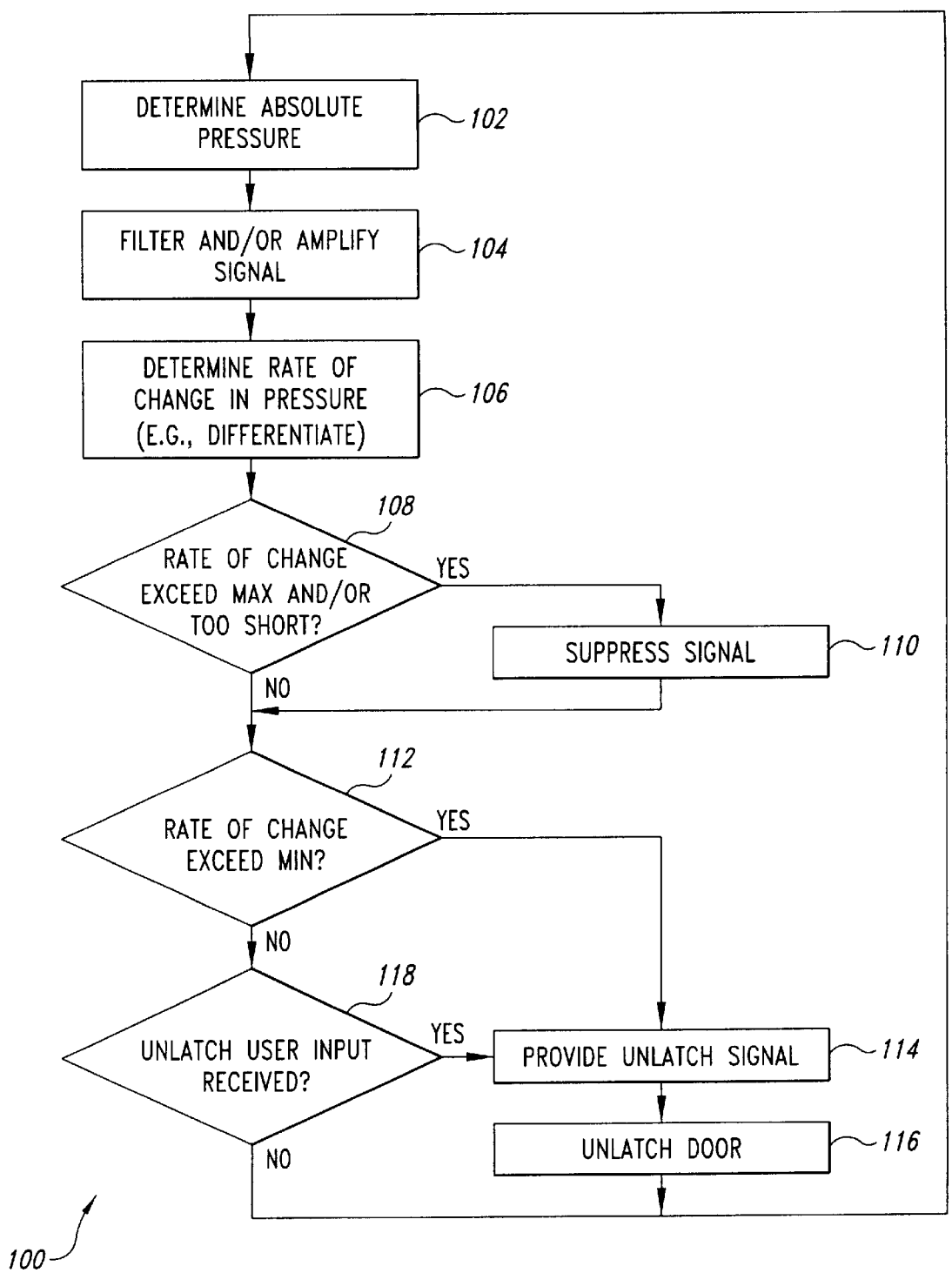
FIG. 6 is a flow diagram of one illustrated method of operating the access control system according to the invention.

FIG. 6 shows one illustrated method 100 of operating the control access system 20. In step 102, the pressure sensors 24 determined the absolute ambient pressure of the flightdeck and/or passenger cabin. As discussed above, suitable pressure sensors may output a signal corresponding to the absolute ambient pressure, or corresponding to a rate of change in ambient pressure.

In step 104, the filter and amplifier stages 66a, 66b of the controller 22 filters and/or amplifies the signals from the pressure sensors 24.

In step 106, the differentiators 68a, 68b of the controller 22 determine the rate of change in pressure from the absolute ambient pressure measurements of the pressure sensors 24.

In step 108, the positive pulse suppression circuitry 72a, 72b determines whether the rate of pressure change has exceed a maximum threshold for the rate of change and/or if the change is of too short a duration to correspond to a rapid decompression event. If either the rate of pressure change has exceed a maximum threshold for the rate of change or if the change is of too short a duration, the positive pulse suppression circuitry 72a, 72b temporarily suppress the signal in step 110.

In step 112, the comparator monostable vibrator stages 70a, 70b determine whether the rate of change of pressure exceeds a minimum threshold corresponding to a rapid decompression event. If the rate of change of pressure exceeds the minimum threshold, the comparator monostable vibrator stages 70a, 70b provides an appropriate signal to the output stage 74, in step 114, and the output stage 74 operates the solenoid 36 to unlatch the door 18 in step 116. The controller 22 then continues to monitor the rate of change in the pressure, returning to step 102.

In step, 118, the controller 22 determines whether an external unlatch signal has been received. An external unlatch may come from a switch on the controller 22, or from some other switch in the flightdeck 14. Typically, such a signal will be generated as a result of the pilot operating a switch to grant access to the flightdeck 14, perhaps in response to a request generated from the request entry module 28. If an external unlatch signal has been received, the microprocessor 64 provides an appropriate signal to the output stage 74, in step 114, and the output stage 74 operates the solenoid 36 to unlatch the door 18 in step 116. The controller 22 then continues to monitor the rate of change in the pressure, returning to step 102.

While not illustrated, the microprocessor 64 may provide for a number of modes. For example, in one mode, the microprocessor 64 may provide the pilot with a defined period of time in which to deny a request for entry, providing the unlatch signal to the output stage 74 if the pilot fails to activate an appropriate switch within the defined time. In this mode, the pilot may 1) unlock the door immediately by activating a first switch; 2) deny entry by activating a second switch; 3) deny entry and enter a 'secure' mode described above; or 4) permit entry by taking no action. In the 'secure' mode, the microprocessor 64 may lock out all requests for access generated by the entry request module 28. This allows the pilots to fly the aircraft 10 without interruption.

Similar subject matter is described in commonly assigned U.S. Provisional Applications Serial Nos. 60/349,774, filed Jan. 16, 2002, entitled "PRESSURE SENSITIVE LATCHING METHOD AND APPARATUS" (Atty. Docket No. 700118.401P1); and No. 60/415,441, filed Oct. 1, 2002, and entitled "PRESSURE SENSITIVE LATCHING METHOD AND APPARATUS" (Atty. Docket No. 700118.401P2). Much of the detailed description provided herein is disclosed in the provisional application, and most additional material, if any, will be recognized by those skilled in the relevant art as being inherent in the detailed description provided in such provisional patent application or well-known to those skilled in the relevant art based on the detailed description provided in the provisional patent application. Those skilled in the relevant art can readily create source code based on the detailed description provided herein.

Although specific embodiments of, and examples for, a secured access system are described herein for illustrative purposes, various equivalent modifications can be made without departing from the spirit and scope of the invention, as will be recognized by those skilled in the relevant art. For example, the secure access system may be employed for controlling access and providing for rapid pressure equalization to other areas of the aircraft, not necessarily between the flightdeck and the passenger cabin. In some embodiments, the functionality can be moved from one subsystem to another. For example, as will be recognized by one skilled in the art, the determination of the rate of change in pressure can be moved from the controller 22 to the sensor modules 24. The teachings provided herein can be readily applied to other secure access systems, not necessarily the exemplary flightdeck secure access system generally described above.

The various embodiments as described above can be combined to provide further embodiments. All of the above U.S. patents, patent applications, and publications referred to in the specification are incorporated herein by reference, in their entirety. Aspects of the invention can be modified, if necessary, to employ systems, circuits, and concepts of the various patents, applications, and publications to provide yet further embodiments of the invention.

These and other changes can be made to the invention in light of the above detailed description. In general, in the following claims, the terms used should not be construed to limit the invention to the specific embodiments disclosed in the specification and claims, but should be construed to include all secured access systems that operate in accordance with the claims. Accordingly, the invention is not limited to the disclosure, but instead its scope is to be determined entirely by the following claims.

I claim:

1. A system for monitoring interior pressure change in an aircraft having a bulkhead separating a flight deck portion of the aircraft from a cabin portion of the aircraft, the bulkhead including a door and a latch, the system comprising:

a first pressure sensor that provides flight deck pressure signals corresponding to a rate of change of an ambient pressure in the flight deck portion of the aircraft and includes:

a first absolute pressure transducer;

a first filter stage coupled to filter the output of the absolute pressure transducer; and a differentiator stage coupled to receive the filtered output of the absolute pressure transducer via the filter and to provide the signals corresponding to the rate of change of the ambient pressure in the flight deck portion of the aircraft; and a first comparator responsive to the flight deck pressure signals to provide a first actuation signal in response to a comparison of the rate of change of the ambient pressure in the flight deck portion to at least a first minimum reference level.

2. A system for monitoring interior pressure change in an aircraft having a bulkhead separating a flight deck portion of the aircraft from a cabin portion of the aircraft, the bulkhead including a door and a latch, the system comprising:

a first pressure sensor that provides flight deck pressure signals corresponding to a rate of change of an ambient pressure in the flight deck portion of the aircraft;

a first comparator responsive to the flight deck pressure signals to provide a first actuation signal in response to a comparison of the rate of change of the ambient pressure in the flight deck portion to at least a first minimum reference level; and a solenoid mechanically coupled to operate the latch, the solenoid being responsive to at least the comparison of the rate of change of the ambient pressure in the flight deck portion to the first minimum reference level.

3. The system of claim 2, further comprising:

a first suppressor to suppress the flight deck pressure signals greater than a first maximum reference level, the first maximum reference level greater than the first minimum reference level.

4. The system of claim 2, further comprising:

a first suppressor circuit electrically coupled between the first pressure sensor and the first comparator to attenuate any of the flight deck pressure signals that are above a first maximum reference level and less than a first reference duration.

5. The system of claim 2, further comprising:

a second pressure sensor that provides cabin pressure signals corresponding to a rate of change of an ambient pressure in the cabin portion of the aircraft; and a second comparator responsive to the cabin pressure signals to provide a second actuation signal in response to a comparison of the rate of change of the ambient pressure in the cabin portion to at least a first minimum reference level, wherein the solenoid is responsive to at least one of the comparison of the rate of change of the ambient pressure in the flight deck portion to the first minimum reference level and the comparison of the rate of change of the ambient pressure in the cabin portion to the second minimum reference level.

6. The system of claim 2 wherein, the solenoid is mechanically coupled to open the latch in at least two events including a loss of power, and the rate of change of the ambient pressure in the flight deck portion exceeding the first minimum reference level.

7. The system of claim 2, further comprising:

a user input device coupled to provide user input signals in response to user input; and a processor coupled to receive the user input signals from the user input device and coupled to the solenoid, wherein the solenoid is responsive to at least the processor and the comparison of the rate of change of the ambient pressure of the flight deck portion to the first minimum reference level.

8. The system of claim 2, further comprising:

a first user input device accessible from within the flight deck, the first user input device coupled to provide signals to the processor;

a second user input device accessible from within the cabin, the second user input device coupled to provide access request signals to the flight deck in response to selected user input; and a processor coupled to receive the user input signals from the first user input device and the access request signals from the second user input device; wherein the solenoid is responsive to at least the processor and the comparison of the rate of change of the ambient pressure in the flight deck portion to the first minimum reference level.

9. A method of monitoring interior pressure change in an aircraft having a bulkhead separating a flight deck portion of the aircraft from a cabin portion of the aircraft, the bulkhead including a door and a latch, comprising:

determining a rate of change in an ambient pressure in the flight deck portion of the aircraft, including:
repeatedly determining the ambient pressure in the flight deck portion of the aircraft;
filtering the determined ambient pressure in the flight deck portion of the aircraft;
differentiating the filtered determined ambient pressure in the flight deck portion with respect to time; and
suppressing any rate of change in the ambient pressure in the flight deck portion of the aircraft exceeding a first maximum reference level; and automatically unlatching the door if the determined rate of change in the ambient pressure in the flight deck portion of the aircraft is between a first minimum threshold and a first maximum threshold, the first maximum threshold greater than the first minimum threshold.

10. A system for monitoring interior pressure change for an aircraft, the system comprising:

a first pressure sensor responsive to a rate of change of a first ambient pressure in a first portion of the aircraft to produce an output proportional to the rate of change of the first ambient pressure in the first portion of the aircraft;

a comparator responsive to the output of the first pressure sensor to control a door locking mechanism based on a comparison of the rate of change of the first ambient pressure to at least a first reference level;

a latch operable to selectively lock and unlock a door in a bulkhead; and an actuator coupled to operate the latch to unlock the door in the bulkhead in response to the rate in change of the first ambient pressure in the first portion of the aircraft exceeding a first minimum reference level.

11. The system of claim 10 wherein the first pressure sensor is in fluid communication with a flight deck of the aircraft.

12. The system of claim 10 wherein the comparator is an analog circuit formed of a number of discrete circuit elements.

13. The system of claim 10, further comprising:

a second pressure sensor responsive to a rate of change of a second ambient pressure in a second portion of the aircraft to produce an output proportional to the rate of change of the second ambient pressure in the second portion of the aircraft, wherein the first portion of the aircraft is a flight deck and the first pressure sensor includes a port that is in fluid communication with the flight deck and the second portion of the aircraft is a passenger cabin and the second pressure sensor includes a port that is in fluid communication with the passenger cabin.

14. The system of claim 10, wherein
the actuator is coupled to operate the latch to unlock the door in the bulkhead in response to the rate in change of the first ambient pressure in the first portion of the aircraft being between the first minimum reference level and a first maximum reference level, the first maximum reference level being greater than the first minimum reference level.

15. The system of claim 10 wherein the first pressure sensor, includes:
an absolute pressure transducer responsive to produce an output proportional to the first ambient pressure in the first portion of the output; and
a differentiator coupled to receive the output of the absolute pressure transducer and responsive thereto to provide the output proportional to the rate of change of the first ambient pressure in the first portion of the aircraft.

16. The system of claim 10 wherein the first pressure sensor, includes:
an absolute pressure transducer responsive to produce an output proportional to the first ambient pressure in the first portion of the output;
a suppressor coupled to suppress portions of the output of the absolute pressure transducer outside of a predefined range; and
a differentiator coupled to receive the output of the absolute pressure transducer and responsive thereto to provide the output proportional to the rate of change of the first ambient pressure in the first portion of the aircraft.

17. A method of monitoring interior pressure change in an aircraft having a bulkhead separating a flight deck portion of the aircraft from a cabin portion of the aircraft, the bulkhead including a door and a latch, comprising:
determining a rate of change in an ambient pressure in the flight deck portion of the aircraft; and
automatically unlatching the door if the determined rate of change in the ambient pressure in the flight deck portion of the aircraft is between a first minimum threshold and a first maximum threshold, the first maximum threshold greater than the first minimum threshold.

18. The method of claim 17 wherein determining a rate of change in an ambient pressure in the flight deck portion of the aircraft includes:
repeatedly determining the ambient pressure in the flight deck portion of the aircraft; and
differentiating the determined ambient pressure in the flight deck portion with respect to time.

19. A method of monitoring interior pressure change in an aircraft having a bulkhead separating a flight deck portion of the aircraft from a cabin portion of the aircraft, the bulkhead including a door and a latch, comprising:
determining a rate of change in an ambient pressure in the flight deck portion of the aircraft; and
automatically unlatching the door if the rate of change in the ambient pressure in the flight deck portion of the aircraft exceeds a first minimum threshold.

20. The method of claim 19 wherein determining a rate of change in an ambient pressure in the flight deck portion of the aircraft includes:
repeatedly determining the ambient pressure in the flight deck portion of the aircraft;
differentiating the determined ambient pressure in the flight deck portion with respect to time; and
suppressing any rate of change in the ambient pressure in the flight deck portion of the aircraft exceeding a first maximum reference level.

21. The method of claim 19 wherein automatically unlatching the door includes applying a signal to a solenoid that is mechanically coupled to the latch.

22. The method of claim 19, further comprising:
determining a rate of change in an ambient pressure in the cabin portion of the aircraft; and
automatically unlatching the door if the rate of change in the ambient pressure in the cabin portion of the aircraft exceeds a second minimum threshold.

23. The method of claim 19, further comprising:
automatically unlatching the door if a power loss condition occurs.

24. The method of claim 19 wherein determining a rate of change in an ambient pressure in the flight deck portion of the aircraft includes:
repeatedly determining the ambient pressure in the flight deck portion of the aircraft; and
differentiating the determined ambient pressure in the flight deck portion with respect to time.

25. A method of operating a latch of a door in an aircraft, comprising:
monitoring a rate of change in a first interior pressure of a first portion of an aircraft;
determining whether the rate of change in the first interior pressure of the first portion of the aircraft satisfies a defined first set of criteria; and
providing an unlatching signal to an actuator to unlatch the door if the rate of change in the first interior pressure in the first portion of the aircraft meets the defined first set of criteria.

26. The method of claim 25 wherein the defined first set of criteria includes a first minimum threshold, and determining whether the rate of change in the first interior pressure of the first portion of the aircraft satisfies the defined first set of criteria includes determining if the rate of change in the first interior pressure of the first portion of the aircraft exceeds the first minimum threshold.

27. The method of claim 25 wherein the defined first set of criteria includes a first minimum threshold and a first maximum threshold, and determining whether the rate of change in the first interior pressure of the first portion of the aircraft satisfies the defined first set of criteria includes determining if the rate of change in the first interior pressure in the first portion of the aircraft is between the first minimum threshold and the first maximum threshold.

28. The method of claim 25, further comprising:
monitoring a rate of change in a second interior pressure of a second portion of the aircraft, the second portion being separated from the first portion by a bulkhead and the door;
determining whether the rate of change in the second interior pressure of the second portion of the aircraft satisfies a defined second set of criteria; and
providing an unlatching signal to the actuator to unlatch the door if the rate of change in the second interior pressure in the second portion of the aircraft meets the defined second set of criteria.

29. The method of claim 25, further comprising:
monitoring a rate of change in a second interior pressure of a second portion of the aircraft, the second portion being separated from the first portion by a bulkhead and the door;

determining whether the rate of change in the second interior pressure of the second portion of the aircraft satisfies a defined second set of criteria; and providing an unlatching signal to the actuator to unlatch the door if the rate of change in the second interior pressure in the second portion of the aircraft meets the defined second defined set of criteria, wherein the defined first set of criteria includes a first minimum threshold and a first maximum threshold and the defined second set of criteria includes a second minimum threshold and a second maximum threshold.

30. The method of claim 25, further comprising:

monitoring a rate of change in a second interior pressure of a second portion of the aircraft, the second portion being separated from the first portion by a bulkhead and the door;

determining whether the rate of change in the second interior pressure of the second portion of the aircraft satisfies a defined second set of criteria; and providing an unlatching signal to the actuator to unlatch the door if the rate of change in the second interior pressure in the second portion of the aircraft meets the defined second defined set of criteria, wherein the defined first set of criteria includes a first minimum threshold and a first maximum threshold and the defined second set of criteria includes a second minimum threshold and a second maximum threshold, the second minimum threshold being equal to the first minimum threshold and the second maximum threshold being equal to the first maximum threshold.

31. A pressure rate sensitive system for use in an aircraft having a flight deck and a cabin separated from the flight deck, the system comprising:

first rate of change means for determining a rate of change in a pressure in the flight deck;

first determination means for determining whether the rate of change in the pressure in the flight deck satisfies a defined first set of criteria; and access controlling means responsive to the first determination means for controlling access between the flight deck and the passenger cabin of the aircraft.

32. The pressure rate sensitive system of claim 31, further comprising:

second rate of change means for determining a rate of change in a pressure in the cabin;

second determination means for determining whether the rate of change in the pressure in the flight deck satisfies a defined first set of criteria, wherein the access controlling means is further responsive to the second determination means for controlling access between the flight deck and the passenger cabin of the aircraft.

33. The pressure rate sensitive system of claim 31 wherein the first rate of change means includes:

a pressure transducer to repeatedly determine a pressure in the flight deck; and a differentiator coupled to the pressure transducer to produce a voltage proportional to the rate of pressure change in the flight deck.

34. The pressure rate sensitive system of claim 31 wherein the first rate of change means includes:

a pressure transducer to repeatedly determine a pressure in the flight deck; and a differentiator coupled to the pressure transducer to produce a voltage proportional to the rate of pressure change in the flight deck; and a suppressor coupled to the differentiator to attenuate output from the differentiator above a first maximum reference level and less than a first reference duration.

35. The pressure rate sensitive system of claim 31 wherein the access controlling means comprises:

a door;

a latch selectively operable to secure the door; and an actuator to selectively operate the latch between a locked position and an unlocked position.

36. The pressure rate sensitive system of claim 31, further comprising:

means for determining an occurrence of a loss of power event, wherein the access controlling means are also responsive to the loss of power determining means for providing access between the flight deck and the passenger cabin of the aircraft in the event of a loss of power.

37. A pressure rate sensitive system for use in an aircraft having a flight deck and a cabin separated from the flight deck, the system comprising:

first rate of change means for determining a rate of change in a pressure in the flight deck, including:

a pressure transducer to repeatedly determine a pressure in the flight deck;

a filter coupled to the pressure transducer to filter noise from an output of the pressure transducer;

a differentiator coupled to the pressure transducer via the filter to produce a voltage proportional to the rate of pressure change in the flight deck; and a suppressor coupled to the differentiator to attenuate output from the differentiator above a first maximum reference level and less than a first reference duration;

first determination means for determining whether the rate of change in the pressure in the flight deck satisfies a defined first set of criteria; and access controlling means responsive to the first determination means for controlling access between the flight deck and the passenger cabin of the aircraft.

* * * * *